United States Patent [19]

Guillon

[11] 4,398,120
[45] Aug. 9, 1983

[54] DIRECT CURRENT SUPPLY PARTICULARLY FOR CATHODE RAY TUBE

[75] Inventor: Jean Pierre Guillon, Paris, France

[73] Assignee: Thomson-CSF, Paris, France

[21] Appl. No.: 252,808

[22] Filed: Apr. 10, 1981

[30] Foreign Application Priority Data

Apr. 14, 1980 [FR] France .................................. 80 08273

[51] Int. Cl.³ ........................ H01J 29/98; H02M 3/18; H02P 13/00
[52] U.S. Cl. ........................................ 315/1; 307/110; 307/18; 323/352; 363/59; 363/100
[58] Field of Search .................. 315/1, 160, 161, 171, 315/200 R, 201, 205, 291; 307/18, 19, 71, 109, 110; 363/59, 60, 61, 100; 323/352

[56] References Cited

U.S. PATENT DOCUMENTS

| | | | |
|---|---|---|---|
| 3,036,259 | 5/1962 | Heilpern | 307/110 X |
| 3,175,104 | 3/1965 | Curtis | 307/109 |
| 3,467,849 | 9/1969 | Wilson | 307/110 X |
| 3,911,292 | 10/1975 | Petrick et al. | 307/110 X |
| 4,281,272 | 7/1981 | Spilsbury | 315/1 |

Primary Examiner—Eugene R. La Roche
Assistant Examiner—Vincent DeLuca
Attorney, Agent, or Firm—Cushman, Darby & Cushman

[57] ABSTRACT

A direct current supply, making it possible to produce a number of separate regulated voltages from a single regulated supply, constituted by a voltage multiplier with cascade-connected doubler stages. One of the doubler stages, preferably the first, supplies by the connection point of its two rectifiers at least one circuit for generating a complementary d.c. voltage. This generator circuit comprises a variable capacitor connected downstream to two oppositely connected diodes and connected to earth or to a fixed d.c. potential, one directly and the other across a resistor and a capacitor connected in parallel.

6 Claims, 2 Drawing Figures

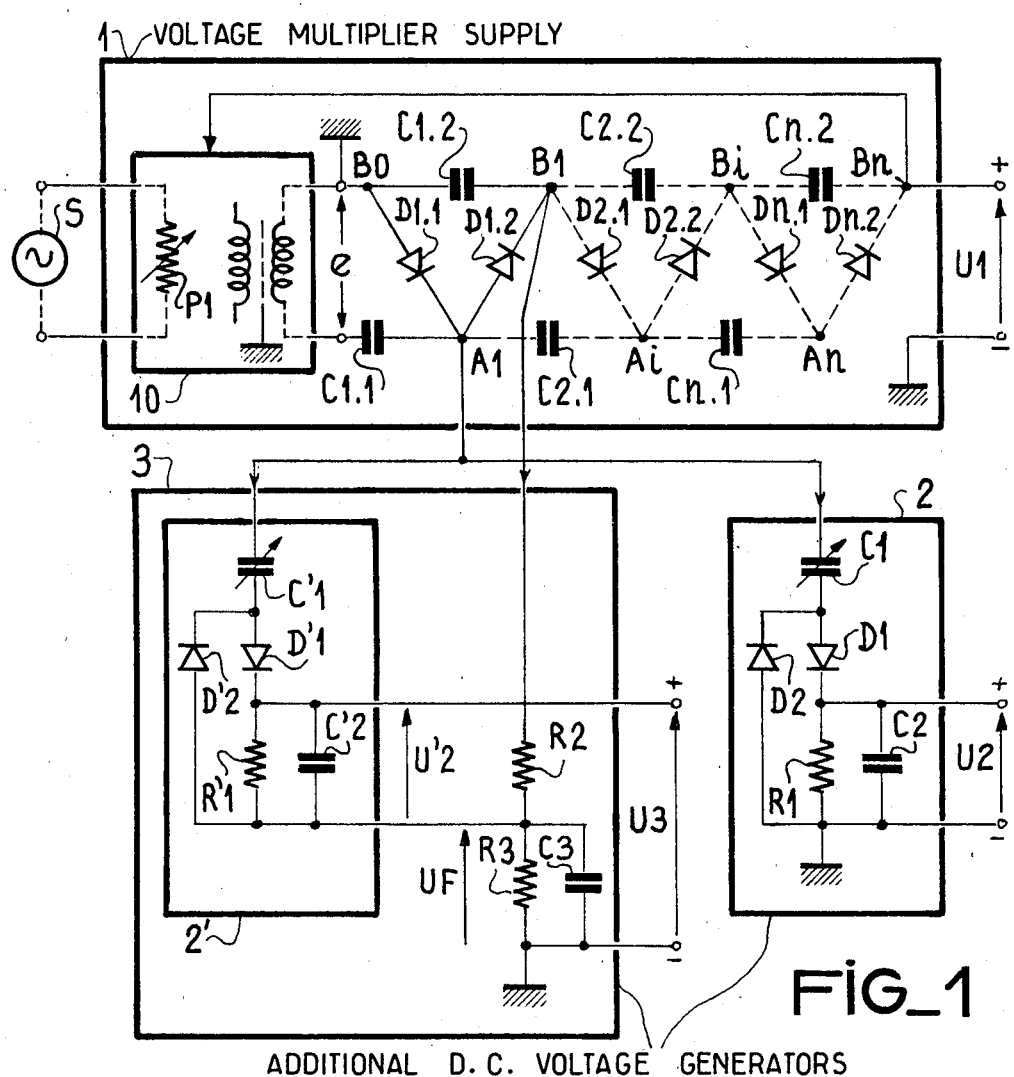
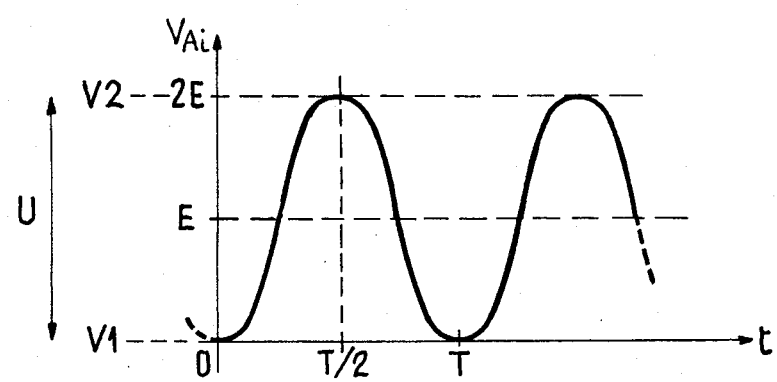

DIRECT CURRENT SUPPLY PARTICULARLY FOR CATHODE RAY TUBE

BACKGROUND OF THE INVENTION

The present invention relates to a direct current supply which is able to supply a number of separately adjustable, stabilized d.c. voltages. It is more particularly intended for use in cathode ray tubes requiring a number of regulated d.c. voltages including high and low voltages as well as extra-high voltage.

In general a d.c. supply requires the same number of regulating circuits as there are low voltage outputs and the same number of conversion circuits as there are high voltage and extra-high voltage outputs. This leads to a large and onerous construction.

BRIEF SUMMARY OF THE INVENTION

The object of the present invention is to obviate these disadvantages by providing a high degree of compactness and a significant economy of components through the use of a single stabilized supply generator on the basis of which the various stabilized d.c. voltages are produced.

According to a feature of the invention the direct current supply is of the voltage multiplyer type comprising a plurality of 2 n of capacitors and a plurality 2 n of rectifiers for supplying n cascade-connected voltage doubler stages and a first d.c. voltage whose value is substantially equal to 2 n times the peak voltage of an a.c. voltage applied to the input, means for regulating the first voltage produced between the output terminal of the last stage and a terminal connected to the reference earth potential, and at least one generator circuit for a second stabilized d.c. voltage, said circuit comprising a first capacitor, connected by one end to the connection point of two rectifiers of a doubler stage, preferably the first stage, and by its other end respectively to the input of a first rectifier and to the output of a second rectifier, the output of the first rectifier being connected to earth across a resistor and a second capacitor connected in parallel, the second rectifier being connected to earth by its input, the second voltage being taken from the terminals of the second capacitor and adjusted by variation of the first capacitor constituted by a variable capacitor.

BRIEF DESCRIPTION OF THE DRAWINGS

The invention is described in greater detail hereinafter relative to non-limitative embodiments and the attached drawings, wherein show:

FIG. 1 an embodiment of a direct current supply according to the invention.

FIG. 2 the input signal of the high and low voltage generators of the d.c. supply of FIG. 1.

DETAILED DESCRIPTION OF THE PREFERRED EMBODIMENTS

The direct current supply comprises means for generating a first regulated d.c. voltage and according to the invention said means are associated with complementary generating means for producing other, also regulated, d.c. voltages.

According to FIG. 1 these generating means correspond to blocks 1, 2 and 3 for respectively producing the first voltage U1 and two other voltages U2 and U3.

The first generating means 1 form a stabilized d.c. supply supplied from a low voltage, auxiliary local a.c. source S. Supply 1 comprises a control loop of output voltage U1, the regulating means being considered as included in block 10 and constructed in accordance with the prior art. Block 10 is also considered to include means for regulating within a given range the amplitude of voltage U1, said means being symbolized by a potentiometer P1 which can act on the amplitude of the input a.c. signal.

The complementary means such as 2 and 3 are also supplied from an a.c. signal (FIG. 2) taken from supply 1 varying between two potentials V1 and V2 with a variation amplitude U regulated by circuit 10.

This a.c. supply signal is supplied by a voltage multiplier-type supply 1 shown in FIG. 1. The multiplier circuit, which is known per se, comprises 2 n capacitors (C1.1 to Cn.1 and C1.2 to Cn.2) and 2 n rectifiers (D1.1 to Dn.1 and D1.2 to Dn.2), forming n cascade-connected voltage doubler stages. The high d.c. voltage U1 is taken from the ends of branch C1.2 to Cn.2 of the capacitors and its value is substantially 2 n times the value of the peak voltage E of the a.c. signal e at the input of the circuit supplied by circuit 10. One of the input terminals BO is common to the output and is connected to the reference earth potential.

Element C1.1 is charged to the peak value E, whilst all the other elements Ci.1 and Ci.2 are charged to value 2E. Each doubler stage Ci.1, Di.1, Ci.2 and Di.2 has two terminals Ai and Bi. The voltage at Ai varies between $(i-1).2E$ and $i.2E$, the latter potential corresponding to the regulated potential at terminal Bi. Signal VAi is used for supplying the complementary means 2 and 3. With regards to the insulation of the components used in circuits 2 and 3 it is preferable to take the signal VAi from the first doubler stage, i.e. between A1 and earth. The corresponding signal VA1 shown in FIG. 2 then varies between $V1=0$ and $V2=VB1=2E$.

The complementary means comprises at least one circuit for generating a second regulated d.c. voltage shown at 2 in the drawing and which comprises a first capacitor C1 connected by one end to connection point Ai of the two rectifiers Di.1 and Di.2 of a doubler stage, preferably the first stage, and by its other end respectively to the input of a first rectifier D1 and to the output of a second rectifier D2. The output of the first rectifier is connected to earth across a resistor R1. A filter capacitor C2 is connected in parallel to resistor R1 and at its terminals supplies the second voltage U2. The second rectifier D2 is connected to earth by its input.

In simplified terms operation is as follows. When the input signal decreases from V2 to V1, component C1 is discharged across D2 to a potential V1 and then when the signal increases from V1 to V2 the charging current of C1 passes into resistor R1 across D1. The voltage U2 obtained at the terminals of R1 is filtered by C2. The charge Q taken by C1 at each period T is given by $Q=C1(U-U2)$, said electricity quantity being equal to the product of the average current traversing R1 in the period, i.e.:

$$\bar{i}T = C1(U-U2) = \frac{\bar{i}}{F}$$

F designating the frequency. In view of the fact that:

$$\bar{i} = U2/R2$$

we obtain the equation:

$$U2 = \frac{C1 \cdot R1 \cdot F}{1 + C1 \cdot R1 \cdot F} \cdot U$$

in which U is regulated and equal to 2E, F being imposed by source S. The variation of U2 can thus be obtained by acting on C1 or R1.

The regulation or control of U2 by varying R1 is less interesting than varying by C1. A rheostat-connected potentiometer has a stability which is a function of the temperature, which is generally inadequate for the performances required. On using high stability resistors the higher the control precision required the higher the stock of separate values which will be necessary.

However, the use of a variable capacitor C1 provides a good temperature behaviour and a high flexibility of use. It is possible to use an adjustable quartz dielectric capacitor having limited overall dimensions, an excellent thermal stability and able to withstand high voltages (e.g. a permanent voltage of 5 kV). In addition, there is no need to provide a stock of components for control and regulation purposes.

Another advantage provided by the generator circuit 2 is the automatic security provided in the case of a short-circuit between the output terminals. Thus, the average current has the value i=F C1 (U−U2) and in the case of a short-circuit U2=0, giving iCC=F C1 U, the maximum value of this short-circuit current iCC being produced for C1 adjusted to its maximum value. The components are consequently provided on the basis of this.

The term rectifier is understood to mean any device able to fulfil this function and generally diodes in solid circuits are used.

It is pointed out that the inversion of the directions of rectifiers D1 and D2 is sufficient to reverse the polarity of the voltage U2 supplied. In this case operation is also reversed during the charging and discharging of C1.

The linear relationship linking U2 and U shows that the second voltage produced is below the value U=2E of this circuit. On assuming in a specific embodiment that U1 is a very high voltage regulatable between 17 and 19 kV by the action of P1 and which can be obtained with n=6 doubler stages from a peak voltage E of approximately 1.5 kV, generator circuit 2 will produce a low voltage U2 below the latter value, dependent on the values chosen for R1 and C1 and regulatable by the action of the variable capacitor C1 in an envisaged range between e.g. 150 and 600 V.

It is possible to provide a number of arrangements, such as circuit 2 for producing several variable low d.c. voltages in separate ranges through the choice of the different values for components R1 and C1. These low voltage outputs can all be available or only one at one time by fitting a switching circuit, the version adopted depending on the operating circumstances.

A constructional variant of generator circuit 2 will now be described with the aim at increasing the value of the d.c. voltage produced which can be made significantly higher than the value U=2E. This makes it possible to obtain one or more regulatable high voltage outputs for the supply, e.g. between 2.5 and 4.5 kV. The process consists of using the circuit 2 as indicated at 2' in FIG. 1 and adding to it a complementary circuit making it possible to produce a fixed d.c. voltage UF which is added to the regulatable voltage U'2 sampled from the capacitor C'2. This fixed voltage is easily produced by a divider bridge R3, R2 between earth and the regulated output B1 of the stage supplying the thus formed generator circuit 3. As the voltage at B1 is 3 kV it is possible in this way to produce e.g. a voltage UF of 2 kV. This voltage is stabilized by the capacitor C3 in parallel with resistor R3. Components D'2, R'1, and C+2 of circuit 2' are indirectly connected to earth across assembly R3–C3 in such a way that the output voltage U3 results from the sum U'2 and UF. The value R'1 is chosen, for example, higher than R1 to obtain U'2 varying between 500 V and 2.5 kV. As indicated hereinbefore several circuits such as 3 can be provided to supply a number of optionally switchable high voltages U3.

No matter whether solution 2 and/or 3 is used for the circuit for generating the complementary voltages U2 and U3 necessary for operation, it is pointed out that the regulation of the supply 1 is advantageous for the various generator circuits 2, 3 leading to regulations of outputs U2 and U3. The stability of these complementary voltages is also linked with that of other parameters F, R1 and C1. In connection with the latter both experience and information supplied by the manufacturers advise a variable quartz capacitor for C1 and resistor R1 is given a high stability, the constraint for F excluding self-oscillating converters whose frequency varies as a function of the conditions such as the charge or temperature.

A d.c. supply according to the invention is eminently suitable for a compact and economic construction, as well as for the supply of a cathode ray tube. It is therefore of particular interest for equipping airborne navigation indication systems provided with cathode visual displays.

The invention has been described with specific reference to such an application by means of FIG. 1. However, this is not intended to constitute a limitation, the conditions for supply 1 being to be able to provide various terminals such as Ai for taking an a.c. signal which can vary between two potentials V1 and V2, whose difference U is stabilized by the control. The a.c. signal is to be considered in a wide sense and can be of the sine-wave or other type, e.g. formed by square-wave pulses. The potentials V1 and V2 are determined with respect to earth potential. Potential V1, also called the reference potential, can correspond to this zero potential, but this is not a requirement for operation.

In addition to the advantages referred to hereinbefore resulting from the small number of components it is also pointed out that the electricity consumption is reduced.

What is claimed is:

1. A direct current supply of the voltage multiplier type comprising:
a plurality 2 n of capacitors and a plurality 2 n of rectifiers for supplying n cascade-connected voltage doubler stages and a first d.c. voltage whose value is substantially equal to 2 n times the peak value of an a.c. voltage applied to the input;
means for the regulation and control of the first voltage produced between the output terminal of the final stage and a terminal connected to the reference potential; and
at least one generator circuit for generating a second stabilized d.c. voltage formed from a first capacitor connected by a first end to the connecting point of the two rectifiers of a doubler stage and by its second end respectively to the input of a first rectifier and to the output of a second rectifier, said first capacitor being formed by an adjustable capacitor for varying the current provided from said connection point and therefore said second voltage, said first and second rectifiers being connected by their other end to the reference potential, said connection being in the case of one of them across a resistor connected in parallel with a second capacitor, the second voltage being taken at the terminals of the second capacitor.

2. A d.c. supply according to claim 1, further including at least one said generator circuit provided with complementary means for producing a fixed d.c. voltage which is added to the voltage at the terminals of said second capacitor to increase said second stabilized output d.c. voltage.

3. A d.c. supply according to claim 2, wherein said complementary means comprises a divider bridge with resistors connected between the output terminal of the doubler stage supplying the first capacitor and the reference potential, the bridge comprising at least two resistive components, whereof one is interposed on the connection from the rectifiers to the reference potential and comprises in parallel a third capacitor.

4. A d.c. supply according to claim 3, wherein the voltage multiplier circuit supplies a very high regulated voltage and comprises at least two generator circuits, one of which being equipped with said complementary means to produce at least two regulated d.c. voltages, respectively a low voltage and a high voltage.

5. A d.c. supply according to claim 3, wherein the said generator circuits and the voltage multiplier supply a cathode ray tube with at least one complementary d.c. voltage and a very high voltage respectively.

6. A d.c. supply according to anyone of claims 1, 3, 5 wherein the first capacitor is connected by its first end to the connection point of the two rectifiers of the first voltage doubler stage.

* * * * *